United States Patent [19]

Messner et al.

[11] Patent Number: 5,480,934
[45] Date of Patent: Jan. 2, 1996

[54] METHOD FOR THE PRODUCTION OF A LOW-VISCOSITY, WATER-SOLUBLE POLYMERIC DISPERSION

[75] Inventors: Bernfried Messner, Greensboro, N.C.; Carl Joachim, Darmstadt, Germany; Gunter Schmitt, Darmstadt, Germany; Manfred Braum, Mainz, Germany; Peter Quis, Darmstadt, Germany

[73] Assignee: Roehm GmbH Chemische Fabrik, Darmstadt, Germany

[21] Appl. No.: 241,577

[22] Filed: May 12, 1994

[30] Foreign Application Priority Data

May 14, 1993 [DE] Germany ............... 43 16 200.2

[51] Int. Cl.$^6$ ................................................ C08L 13/02
[52] U.S. Cl. ..................... 524/458; 524/457; 524/459; 524/460; 524/461
[58] Field of Search .......................... 524/457, 458, 524/459, 460, 461

[56] References Cited

U.S. PATENT DOCUMENTS

| | | | |
|---|---|---|---|
| 4,380,600 | 4/1983 | Hosoda et al. | 524/458 |
| 5,045,587 | 9/1991 | Tanaka . | |

FOREIGN PATENT DOCUMENTS

| | | |
|---|---|---|
| 0170394 | 2/1986 | European Pat. Off. . |
| 0183466 | 6/1986 | European Pat. Off. . |
| 0445619 | 9/1991 | European Pat. Off. . |
| 0573793 | 12/1993 | European Pat. Off. . |
| 4216167.3 | of 0000 | Germany . |
| 2924663 | 12/1979 | Germany . |
| 59-108074 | 6/1984 | Japan . |
| WO 87/00848 | 2/1987 | WIPO . |

*Primary Examiner*—Edward J. Cain
*Attorney, Agent, or Firm*—Oblon, Spivak, McClelland, Maier & Neustadt

[57] ABSTRACT

An aqueous, low-viscosity, water-soluble polymeric dispersion containing a polymer (A) is prepared by copolymerizing monomers:

(a1) 99 to 70 weight % of at least one water-soluble monomer, (a2) 1 to 30 weight % of at least one hydrophobic monomer and, (a3) 0 to 20 weight % of at least one amphiphilic monomer, which monomers constitute 100 weight % of the polymers forming material which polymer (A) has an average molecular weight $M_W$ (mean weight) of at least $5 \times 10^5$ Dalton, said process comprising:
a first step i) of reacting said monomer ingredients in an aqueous dispersion in the presence of at least one polymeric dispersing agent (D) thereby preparing a dispersion of polymer (A); and a second step ii) of adding at least one polymeric dispersion agent (D), in an aqueous solution, to the dispersion.

20 Claims, No Drawings

METHOD FOR THE PRODUCTION OF A LOW-VISCOSITY, WATER-SOLUBLE POLYMERIC DISPERSION

BACKGROUND OF THE INVENTION

1. Field of the Invention

The present invention relates to a two-step method for the production of a low-viscosity, water-soluble polymeric dispersion containing at least one polymeric dispersing agent (D) and a polymer (A) consisting of (a1) at least one water-soluble monomer, (a2) at least one hydrophobic monomer and, if necessary, (a3) at least one amphiphilic monomer.

2. Discussion of the Background

Aqueous dispersions of water-soluble polymers are used, for example, as a flocculent in the treatment of wastewater, as a dehydrating agent after the aqueous phase is separated, as a retention agent in paper production, as a soil improvement agent or as a dispersing agent.

EP 170 394 describes a liquid which can be mixed with water. This liquid consists of particles which are composed of a high-molecular polymeric gel with particle sizes greater than 20 μm in an aqueous solution. The continuous phase is an aqueous solution which contains an equilibrium agent which keeps the water content of the gel particles in equilibrium with the water portion in the continuous phase and thus prevents agglomeration of the gel particles. Preferred equilibrium agents are the sodium salt of polyacrylic acid or polydiallyldimethylammonium chloride (Poly-DADMAC).

EP 183 466 describes a method for the production of a water-soluble polymeric dispersion in which a water-soluble monomer is polymerized while stirring therein at least one salt in the presence of a dispersing agent in an aqueous solution. Polyhydric alcohols, polyalkylene ethers, alkali salts of polyacrylic acid and alkali salts of poly-2-acrylamido- 2-methylpropane sulfonic acid are used as dispersing agents or salts, which do not solvate the polymer in aqueous solution.

DE-PS 29 24 663 describes a method for the production of an aqueous dispersion from a water-soluble polymer substance having good stability and flowability. The water-soluble polymer contains at least one water-soluble ethylenically unsaturated monomer. A polyalkylene ether, polyethylenimine or the like can be used as a dispersing agent, if necessary, in the presence of inorganic salts. The aqueous dispersion produced in this way can be used, if necessary after it is diluted with water, as a flocculent aid, a thickening agent, a soil conditioning agent, and in other applications.

JP Kokkai 59 108 074 describes thickening agents which consist of polymers in aqueous solution which contain (meth)acrylic acid and/or their salts, (meth)acrylic amides, as well as methyl or ethyl acrylate as monomeric components, with polyethyleneglycol as dispersing agent.

German patent application P 42 16 167.3 describes aqueous dispersions of water-soluble polymers which are produced by polymerization of a mixture consisting of water-soluble, hydrophobic and if necessary amphiphilic monomers in the presence of a polymeric dispersing agent.

The aqueous solutions described in EP 170 394, which contain gel particles, have the disadvantage that they have elevated viscosities after a longer static period. The viscosity can only be lowered by the application of shear forces such as by stirring. The characteristics of the liquid depend on a complex equilibrium between polymer, equilibrium agent, water content and particle size of the gel particles.

In EP 183 466 water-soluble polymers, with the help of a dispersing agent, are used as dispersions in aqueous saline solutions. The disadvantage of these dispersions is the high salt content of the aqueous phase (up to 30 weight %) in comparison to a relatively low polymer (active ingredient) content (up to 20 weight %), which can lead to wastewater problems in certain applications of such dispersions.

A negative effect of the use of aqueous dispersions described in DE-PS 29 24 663 is the high number of parts of dispersing agents relative to the water-soluble polymer. If the above mentioned dispersion is used as a flocculent for (electrically) charged parts, for example, the active ingredient on high-molecular ionic polymers is reduced by the comparatively low-molecular dispersing agent.

The polymers which have a thickening effect produced in accordance with JP Kokkai 59 108 075 have an average molecular weight $M_W$ between $10^5$ and $5 \times 10^5$ Dalton (mean weight), which is considerably too low for use as a flocculent.

The task to produce aqueous dispersions of water-soluble polymers with low viscosity, a high polymer active ingredient content, a high polymer molecular weight and a salt-free aqueous phase, which results from the above mentioned state of the art, is accomplished by the invention's polymers in aqueous dispersion in accordance with P 42 16 167.3. However, within the parameters of viscosity of the aqueous dispersion, high content of polymer active ingredient and high polymer molecular weight, a need continues to exist for such aqueous polymer dispersions of low-viscosity.

SUMMARY OF THE INVENTION

Accordingly, one object of the present invention is to provide an aqueous water-soluble polymer dispersion of low-viscosity containing a polymer of high molecular weight.

Briefly, this object and other objects of the present invention as hereinafter will become more readily apparent, can be attained by a process of preparing an aqueous polymer dispersion of low-viscosity, in which the polymer has a high molecular weight by first polymerizing different monomer components (a1), (a2) and, optionally monomer (a3) in the presence of a polymeric dispersing agent, wherein (a1) is 99 to 70 weight % of at least one water-soluble monomer, (a2) is 1 to 30 weight % of at least one hydrophobic monomer, and (a3) is 0 to 20 weight %, preferably 0.1 to 15 weight %, of at least one amphiphilic monomer, thereby forming water-soluble polymer (A) having an average molecular weight (mean weight) of at least $10^6$ Dalton, and then adding at least one polymeric dispersing agent (D) to the aqueous dispersion. Preferred polymeric dispersing agents (D) are polyelectrolytes with an average molecular weight (mean weight) of $M_W < 5 \times 10^5$ Dalton or polyalkylene ethers which are incompatible with the dispersed polymer (A).

DETAILED DESCRIPTION OF THE PREFERRED EMBODIMENTS

In a preferred aspect of the invention at least one of the water-soluble monomers (a1) has at least one ionic group if the hydrophobic monomer (a2) is a compound of formula I:

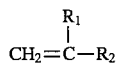

wherein $R_1$ is hydrogen or methyl, $R_2$ is alkyl of 1 to 4 carbon atoms, cycloalkyl of 5 to 12 carbon atoms, aryl of 6 to 12 carbon atoms, or $$-\underset{\underset{O}{\|}}{C}-Z-R_3$$

wherein $R_3$ is alkyl of 2 to 8 carbon atoms and Z is O, —NH or —$NR_3$.

Aryl is preferably phenyl or naphthyl substituted by $C_1$ to $C_4$-alkyl residues.

The amphilic monomer (a3) preferably is a compound of formula II:

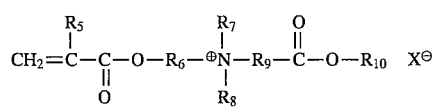

wherein $R_5$ is hydrogen or methyl, $R_6$ is alkylene of 1 to 6 carbon atoms, $R_7$ and $R_8$, independently of one another, are each alkyl of 1 to 6 carbon atoms, $R_9$ is alkylene of 1 to 6 carbon atoms, $R_{10}$ is alkyl of 8 to 32 carbon atoms, and X is halogen, pseudohalogen, $SO_4CH_3$, acetate, wherein pseudohalogen is —CN—, —OCN— and —SCN— groups, or a compound of formula III:

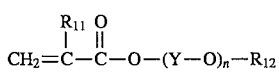

wherein $R_{11}$ is hydrogen or methyl, $R_{12}$ is alkyl of 8 to 12 carbon atoms, Y is alkylene of 2 to 6 carbon atoms, and n is an integer between 1 and 50.

Salts of acrylic- and/or methacrylic acid of formula IV can be used as monomers (a1), for example:

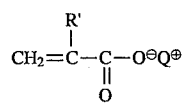

wherein

R' is hydrogen or methyl and $Q^\oplus$ is an alkali metal ion such as $Na^\oplus$ or $K^\oplus$, an ammonium ion, such as $NH_4^\oplus$, $^\oplus NR''_2H_2$, $^\oplus NR''_3H$ or $^\oplus NR''_4$ with R''=alkyl of 1 to 6 carbon atoms or another monovalent, positive ion.

Monomers (a1) of formula IV include, for example, sodium (meth) acrylate, potassium (meth) acrylate ammonium (meth) acrylate, and the like.

Furthermore, acrylic- and/or methacrylic acid can be used as monomer component (a1), as well as methacrylic amides of formula V:

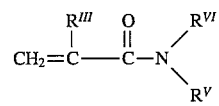

wherein $R^{III}$ is hydrogen or methyl, and $R^{IV}$ and $R^V$ independently of one another are hydrogen, or alkyl of 1 to 5 carbon atoms.

Monomers (a1) of formula V include (meth)acrylic amide, N-methyl(meth)acrylic amide, N,N-dimethyl (meth)acrylic amide, N,N-diethyl(meth)acrylic amide, and N-methyl-N-ethyl(meth)acrylic amide, as well as N-hydroxyethyl (meth) acrylic amide. To produce the (meth)acrylic amides see for example Kirk-Othmer, Encyclopedia of Chemical Technology, vol. 15, pages 346 to 276, 3d edition, Wiley Interscience, 1981.

Furthermore monomers of formula VI can be used as monomer component (a1):

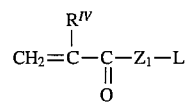

wherein $R^{VI}$ is hydrogen or methyl,

L stands for the groups

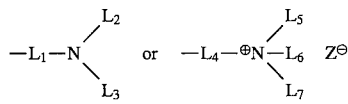

wherein $Z_1$ is O, NH or $NR_4$, wherein $L_1$ and $L_4$ are each alkylene or hydroxyalkylene of 2 to 6 carbon atoms, $L_2$, $L_3$, $L_5$, $L_6$, and $L_7$ are each alkyl of 1 to 6 carbon atoms, and Z is halogen, acetate, or $SO_4CH_3$.

Suitable examples of monomers (a1) of formula VI include 2-(N,N-dimethylamino)ethyl(meth)acrylate, 3-(N,N-dimethylamino)propyl(meth)acrylate, 4-(N,N-dimethylamino)butyl(meth)acrylate, 2-(N,N-diethylamino)ethyl(meth)acrylate, 2-hydroxy-3-(N,N-dimethylamino)propyl(meth)acrylate, 2-(N,N,N-trimethyl ammonium)ethyl(meth)acrylate chloride, 3-(N,N,N-trimethyl ammonium)propyl(meth)acrylate chloride and 2-hydroxyl-3-(N,N,N-trimethylammonium)propyl(meth)acrylate chloride and the (meth)acrylic amides or compounds such as 2-dimethylaminoethyl(meth)acrylic amide, 3-dimethylaminopropyl(meth)acrylic amide and 3-trimethylammonium-propyl(meth)acrylic amide chloride. Monomer components (a1) include ethylenically unsaturated monomers which are capable of producing water-soluble polymers such as vinylpryridine, N-vinylpyrrolidone, styrenesulfonic acid, N-vinylimidazole, diallyldimethylammonium chloride, and the like.

Combinations of different water-soluble monomers, listed under (a1) are also possible. For the preparation of (meth) acrylic ammonium salts see, for example, Kirk-Othmer, Encyclopedia of Chemical Technology, vol. 15, pages 346 to 376, Wiley Interscience, 1987.

Suitable hydrophobic monomers (a2) include, for example, monomers of formula I:

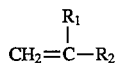
(I)

wherein $R_1$ is hydrogen or alkyl of 1 to 5 carbon atoms, and $R_2$ is alkyl of 1 to 4 carbon atoms, cycloalkyl of 5 to 12 carbon atoms, aryl of 6 to 12 carbon atoms, or

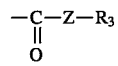

wherein $R_3$ is alkyl of 2 to 8 carbon atoms, cycloalkyl of 5 to 12 carbon atoms or aryl of 6 to 12 carbon atoms and Z is O, NH or $NR_3$.

Suitable examples include styrene, α-methyl styrene, p-methylstyrene, p-vinyltoluene, vinylcyclopentane, vinylcyclohexane, vinylcyclooctane, isobutene, 2-methylbutene-1, hexene-1, 2-methylhexene-1, 2-propylhexene-1, ethyl(meth)acrylate, propyl(meth)acrylate, isopropyl(meth)acrylate, butyl(meth)acrylate, isobutyl(meth)acrylate, pentyl(meth)acrylate, hexyl(meth)acrylate, heptyl(meth)acrylate, octyl(meth)acrylate, cyclopentyl(meth)acrylate, cyclohexyl(meth)acrylate, 3,3,5-trimethylcyclohexyl (meth) acrylate, cylcooctyl(meth)acrylate, phenyl(meth)acrylate, 4-methylphenyl(meth)acrylate, 4-methoxyphenyl(meth)acrylate, and the like.

Furthermore the following can be used as hydrophobic monomers (a2): ethylene, vinylidene chloride, vinylidene fluoride, vinyl chloride or other mainly (ar)aliphatic compounds having polymerizable double bonds. Combinations of different hydrophobic monomers (a2) are possible.

Amphiphilic monomers (a3) include monomeric compounds of formulas II and III:

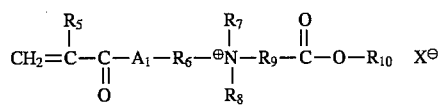
(II)

wherein $A_1$ is O, NH, $NR_4$ wherein $R_4$ is alkyl of 1 to 4 carbon atoms, $R_5$ is hydrogen or methyl, $R_6$ is alkylene of 1 to 6 carbon atoms, $R_7$ and $R_8$, independently of each other, are alkyl of 1 to 6 carbon atoms, $R_9$ is alkylene of 1 to 6 carbon atoms, $R_{10}$ is alkyl, aryl and/or aralkyl of 8 to 32 carbon atoms and X is halogen, pseudohalogen, $SO_4CH_3$ or acetate, or

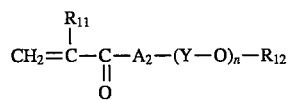
(III)

wherein $A_2$ is O, NH, $NR_{13}$ wherein $R_{13}$ is alkyl of 1 to 4 carbon atoms, $R_{11}$ is hydrogen or methyl, $R_{12}$ is alkyl, aryl and/or aralkyl of 8 to 32 carbon atoms, Y is alkylene of 2 to 6 carbon atoms, and n is an integer of between 1 and 50.

In order to produce the amphiphilic monomers of formula II see, for example, Kirk-Othmer, Encyclopedia of Chemical Technology, vol. 1, 3d ed., pages 330 to 354 (1978) and vol. 15, pages 346 to 376 (1981), Wiley Interscience.

Examples include:

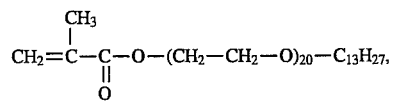

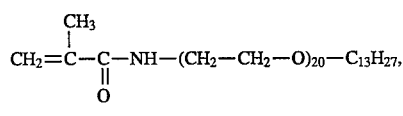

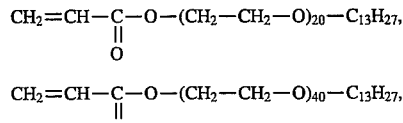

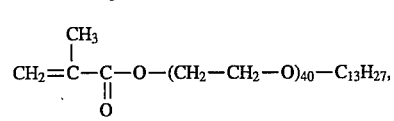

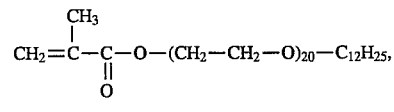

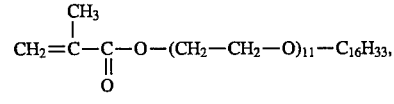

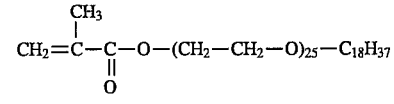

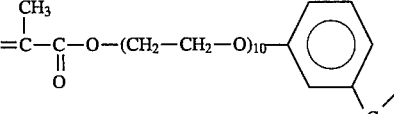

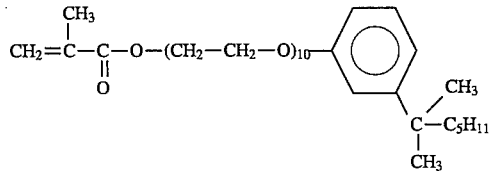

Furthermore the following can be used as amphiphilic monomers (a3):

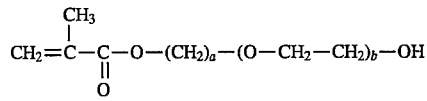

with a=6 to 15 and b=1 to 50

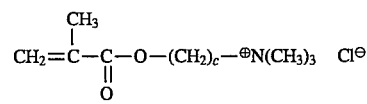

with c=6 to 18

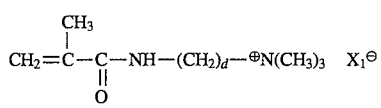

with $X_1^\ominus = Cl^\ominus$ or $SO_4CH_3^\ominus$ and $d=6$ to $18$

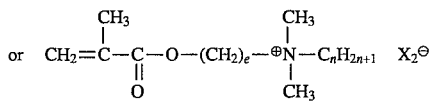

with $e=2$ to $6$ and $n=6$ to $18$ $X_2^\ominus = Cl^\ominus$ or $SO_4CH_3^\ominus$ Combinations of different amphiphilic monomers (a3) are possible.

Polymeric Dispersing Agent (D)

The polymeric dispersing agent is significantly different in its chemical composition and in its average molecular weight $M_W$ (mean weight) from the water-soluble polymer which consists of the monomeric mix (A), wherein the polymeric dispersing agent (D) is incompatible with the water-soluble polymer. The average molecular weights $M_W$ of the polymeric dispersing agents range between $10^3$ to $5\times10^5$ Dalton, preferably between $10^4$ to $4\times10^5$ Dalton (to determine $M_W$ see H. F. Mark et al., Encyclopedia of Polymer Science and Technology, vol. 10, pages 1 through 19, J. Wiley, 1987).

The polymeric dispersing agents (D) contain at least one functional group selected from the group consisting of ether-, hydroxyl-, carboxyl-, sulfone-, sulfate ester-, amino-, amido-, imino-, tertiary-amino- and/or quaternary ammonium groups.

Examples of Polymers (D) include:

cellulose derivatives, polyethylene glycol, polypropylene glycol, copolymers from ethylene glycol and propylene glycol, polyvinyl acetate, polyvinyl alcohol, starch and starch derivatives, dextran, polyvinyl pyrrolidone, polyvinyl pyridine, polyethyleneimine, polyvinyl imidazole, polyvinyl succinimide, polyvinyl-2-methyl succinimide, polyvinyl-1, 3-oxazolidone-2, polyvinyl-2-methyl imidazoline, as well as copolymers which, apart from the combinations of monomeric units of the above mentioned polymers, can contain the following monomer units: maleic acid, maleic anhydride, fumaric acid, itaconic acid, itaconic anhydride, (meth)acrylic acid, salts of (meth)acrylic acid or (meth)acrylic amide compounds.

Preferred polymeric dispersing agents (D) include polyalkylene ethers such as polyethylene glycol, polypropylene glycol or polybutylene-1,4-ether. For the production of polyalkylene ethers see, for example, Kirk-Othmer, Encyclopedia of Chemical Technology, 3d ed., vol. 18, pages 616 to 670, 1982, Wiley Interscience.

Especially suitable polymeric dispersing agents (D) include polyelectrolytes such as polymers which contain monomer units such as salts of (meth)acrylic acid, anionic monomer units or derivatives quaternated with methyl chloride such as N,N-dimethylaminoethyl(meth)acrylate, N,N-dimethylaminopropyl(meth)acrylate N,N-dimethylaminohydroxypropyl(meth)acrylate amide and N,N-dimethylaminopropyl(meth)acrylic amide. Especially suitable as a polymeric dispersing agent is poly(diallyldimethylammonium chloride) (Poly-DADMAC) with an average molecular weight $M_W$ between $5\times10^4$ and $4\times10^5$ Dalton. For the production of polyelectrolytes see, for example, Kirk-Othmer, Encyclopedia of Chemical Technology, 3d ed., vol. 18, pages 495 to 530, 1982, Wiley Interscience.

Furthermore low-molecular emulsifying agents having a molecular weight $<10^3$ Dalton in quantities of 0 to 5 weight % based on the polymer dispersion can be used.

The Two-Step Method of Production

Step 1: Production and characteristics of the water-soluble polymer (A) from monomer mix (a1), (a2) and, if necessary, (a3) in aqueous solution.

The amount of the mixture of monomers (a1), (a2) and, if necessary, (a3) in terms of 100 parts by weight water as reaction medium ranges between 5 and 80 parts by weight, preferably between 10 and 50 parts by weight. If monomers (a1) and if necessary (a3) are used as an aqueous solution, the water portion is added to the reaction medium.

The amount of the polymeric dispersing agent (D), based on 100 parts by weight water as reaction medium, ranges between 1 and 50 parts by weight, preferably between 2 and 40 parts by weight and especially preferably between 5 and 30 parts by weight. To initiate the polymerization, a radical initiator is normally employed, although high-energy radiation such as UV light may be employed. Preferred radical initiators include 2,2'-azobisisobutyronitrile, 2,2'-azobis(2-amido propane)dihydrochloride, preferably dissolved in dimethyl formamide, potassium sulfate, ammonium persulfate, hydrogen peroxide, if necessary used in combination with a reducing agent such as an amine or a sodium sulfite. The amount of the initiator, based on the mixture of monomer (a1), (a2) and, if necessary, (a3) usually ranges between $10^{-5}$ and 5 weight percent, preferably between $10^{-4}$ and 1 weight percent. The initiator can be added completely at the beginning of the polymerization or it can be added in parts in the following dosages throughout the entire polymerization process. The monomer mix (a1), (a2), and if necessary (a3) can also be added completely at the beginning of the polymerization process or it can be added as an admixture throughout the entire polymerization process. The polymerization temperature is between 0° and 100° preferably between 40° and 55° C.

It is advantageous to conduct the polymerization under a protective atmosphere, for example under a nitrogen atmosphere. The final conversion of reaction monomers in the polymerization reaction normally is above 97 weight % of the monomer mix (a1), (a2) and, if necessary, (a3). The polymerization duration ranges between 1 and 8 hours.

Step 2: The polymeric dispersing agent (D) is added to the aqueous dispersion of polymer (A) produced in the first step.

For the mixing process, static, as well as dynamic mixers, can be used. While the static mixers work through turbulence which is produced in the liquid mixtures when the mixtures flow through the mixers, the turbulence in the dynamic mixers is produced actively (see for example Römpps Chemielexikon, 9th ed , page 2805 Georg Thieme, Stuttgart, New York, 1991).

Preferred are mixers with propellers, inclined blade mixers, disk mixers, impeller agitators, cross-arm agitators, grid mixers, anchor mixers, screwspindle mixers or helical ribbon impellers whereby mixers which produce a small shear rate during mixing are preferred (see, e.g., Römpps Chemielexikon, 9th ed., pages 3939 to 2940 [sic], Georg Thieme, Stuttgart, New York, 1992). For the mixing procedure it is preferable to use all the aqueous dispersion of the polymer (A) produced in step 1 and to add the polymeric dispersing agent (D) step by step while stirring.* The viscosity of the mixture is monitored continually. In an especially preferred mode of the invention the aqueous dispersion of the polymer is heated to 30° to 90° C., preferably to 40° to 70° C., in order to keep the viscosity as low as possible during the mixing process.

*The amount of added dispersing agent (D) based on 100 parts by weight of aqueous dispersion of polymer (A) produced in step 1 ranges between 1 and 50 parts by weight, preferably between 2 and 40 parts by weight and especially preferably between 5 and 30 parts by weight.

Then the viscosity of the polymer dispersion and a 1% solution (referred to as polymer (A), which is produced by dilution with water, is determined.

Advantages of the Invention

In comparison to a polymeric dispersion consisting of a polymer which does not have hydrophobic monomer units (a2), the aqueous polymer dispersions of the present invention are characterized by a surprisingly low viscosity measured against the polymer concentration and the average molecular weight $M_W$ of the polymer, consisting of monomer units according to mixture (A). By integrating amphiphilic monomer units (a3) into the polymer the viscosity of the aqueous polymer dispersion can be further reduced. This improves the use of aqueous polymer dispersions with a high polymer share (and therefore high number of active ingredients) considerably. By adding the polymeric dispersing agent (D) in aqueous solution (Step 2), the viscosity is again reduced considerably, which results in even higher amount of polymer (A) in the invention's dispersions and therefore even higher active ingredient contents. When diluting the aqueous polymer dispersion with water, the current viscosity climbs to a very high maximum, and the system clears. The thickening effect of the dispersed polymer becomes obvious. The viscosities of the aqueous polymer solutions with 1% polymer content are at a high level, whereby the preferred dispersing agent (D) Poly-DADMAC functions simultaneously as active ingredient, i.e. as catch-all for cycle water and as support for flocculation in the coagulation of sewage sludge, for example. Another advantage of the inventions's aqueous polymer dispersions is the high shear- and static stability. The high viscosity of an aqueous solution with 1% polymer content remains constant even after a longer period of stirring.

The absence of organic solvents guarantees safe handling (no flammability) and ecologically safe use of the invention's polymer dispersions as a thickening agent, a flocculent aid for (electrically) charged floating particles, as a retention agent in paper production and/or as a soil improvement agent. In isolated or dry form the invention's polymer can be used as dehydrating agent in the sanitation field, for example.

Having generally described this invention, a further understanding can be obtained by reference to certain specific examples which are provided herein for purpose of illustration only and are not intended to be limiting unless otherwise specified.

The following physical properties, described in the examples, were determined as follows:

Dynamic viscosity $\eta$ [mPa.s] according to DIN (German Industry Standard) 53018/53019.

Molecular weight $M_W$: per gel permeation chromatography (standard: poly(2-trimethylammoniumethylacrylate chloride)

STB II (S): In accordance with company internal regulations, the chronological gradient of the turbidity value in solutions containing flocculents is determined after the flocculation process is completed.

COMPARISON EXAMPLE

Production of the aqueous dispersion of polymer (A) without the addition of the aqueous dispersion of the dispersing agent (D) in Step 2.

Degas 685 g of a 35% aqueous poly-DADMAC solution ($M_W$= 3.18×10⁵ Dalton), 180 g acrylic amide, 250 g of an 80% aqueous 2-trimethylammoniumethylacrylate chloride solution, 20 g butyl acrylate and 865 g water in a reaction vessel with $N_2$ and heat to 50° C. while stirring.

Then add 0.04 g of 2,2'-azobis[2-(2-imidazoline-2-yl)propane] (AIP). After stirring for 3 hours, increase the temperature to 75° C. and add another 0.4 g AIP.

The polymerization is completed after another hour.

The dynamic viscosity of the aqueous polymer dispersion is $n_1$=60,000 mPa s. The dynamic viscosity of a 1% aqueous solution (referring to polymer (A) is $n_2$=2 100 mPa s.

The STB II is 7,4 s (corresponding to the time a flocculent layer requires to drop over a certain distance).

The average molecular weight $M_W$ of the polymer is $M_W$>10⁶ Dalton.

EXAMPLE 1

Heat 1,000 g of the aqueous dispersion of polymer (A) described in the comparison example to 50° C. in the drying chamber. With the aid of a propeller mixer (with 200 rpms) 111.1 g of a 40%, aqueous Poly-DADMAC solution I ($M_W$ of the Poly-DADMAC: 3.18×10⁵ Dalton) is added over a period of 5 minutes.

The results are:

$\eta_1$=31 600 mPa's $\eta_2$=1 920 mPa's

STB II=8.2 s

Under the same conditions add another 222.2 g of the 40%, aqueous Poly-DADMAC solution I ($M_W$ of the poly-DADMAC: 3.18× 10⁵ Dalton) to this solution over a period of 5 minutes.

The results are:

$\eta_1$=15 300 mPa.s $\eta_2$=1 320 mPa.s

STB II=7.5 s

EXAMPLE 2

Heat 1,000 g of the aqueous dispersion of polymer (A) described in the comparison example to 50° C. in the drying chamber.

With the aid of a propeller mixer (200 rpms) 111.1 g of a 35%, aqueous Poly-DADMAC solution II ($M_W$ of the Poly-DADMAC: 1.05×10⁵ Dalton) is added over a period of 5 minutes.

The results are:

$\eta_1$=28 700 mPa's $\eta_2$=1 850 mPa.s

STB II=7.2 s

Under the same conditions another 222.2 g of the 25% [sic], aqueous Poly-DADMAC solution II ($M_W$ of the Poly-DADMAC: 1.05×10⁵ Dalton) is added to this solution over a period of 5 minutes.

The results are:

$\eta_1$=7 800 mPa.s $\eta_2$=1 280 mPa.s

STB II =8.4 s

EXAMPLE 3

Production of the Aqueous Dispersion of Polymer (A)

Degas 391.4 g of a 35% aqueous Poly-DADMAC solution ($M_W$= 3.18×10⁵ Dalton), 90 g acrylamide, 125 g of an 80% aqueous 2-trimethylammoniumethylmethacrylate chloride solution, 10 g butyl acrylate and 385.6 g water in a reaction vessel with $N_2$ and heat to 53° C. while stirring.

Then add 0.02 g AIP in 0.18 g water. After stirring for three hours, increase the temperature to 65° C. and another 0.2 g of AIP in 1.8 g water is added.

The polymerization is completed after another hour.

The results are:

| | |
|---|---|
| $\eta_1$ = 261 000 mPa · s | |
| $\eta_2$ = 2 590 mPa · s | |
| $\eta_2$ = 2 400 mPa · s | (after stirring for 10 minutes in cooled condition) |
| STB II = 10.2 s | |
| STB II = 10.4 s | (after stirring for 10 minutes in cooled condition) |

EXAMPLE 4

Heat 1,000 g of the aqueous dispersion of polymer (A) described in Example 3 to 50° C. in the drying chamber. With the aid of a propeller mixer (200 rpms), 166.6 g of a 40%, aqueous poly-DADMAC solution I ($M_W$ of the poly-DADMAC: $3.18 \times 10^5$ Dalton) is added over a period of 5 minutes.

The results are:

| | |
|---|---|
| $\eta_1$ = 51 900 mPa · s | |
| $\eta_2$ = 50 800 mPa · s | (after stirring for 10 minutes in cold condition) |
| $\eta_2$ = 1 800 mPa · s | |
| $\eta_2$ = 1 770 mPa · s | (after stirring for 10 minutes in cold condition) |
| STB II = 11.1 s | |
| STB II = 11.5 s | (after stirring for 10 minutes in cold condition) |

EXAMPLE 5

Comparison example: Adding the aqueous dispersing agent solution (D) before polymerization of polymer (A).

A 1000 g amount of the monomer solution of Example 3 is admixed with 166.6 g of a 40% aqueous Poly-DADMAC solution I ($M_W$ of the Poly-DADMAC: $3.18 \times 10^5$ Dalton) and the mixture is polymerized according to Example 3.

The results are:

| | |
|---|---|
| $\eta_1$ = 227 000 mPa · s | |
| $\eta_1$ = 220 000 mPa · s | (after stirring for 10 minutes in cold condition) |
| $\eta_2$ = 1 440 mPa · s | |
| $\eta_2$ = 1 390 mPa · s | (after stirring for 10 minutes in cold condition) |
| STB II = 12.4 s | |
| STB II = 14.5 s | (after stirring for 10 minutes in cold condition) |

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for the production of aqueous low-viscosity, water-soluble polymeric dispersions, containing a polymer (A) consisting of the monomeric components:

(a1) 99 to 70 wt. % of at least one water-soluble monomer;

(a2) 1 to 30 wt % of at least one hydrophobic monomer, which is a compound of the formula (I):

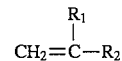

wherein $R_1$ is hydrogen or alkyl with 1 to 4 carbon atoms, and $R_2$ is alkyl with 1 to 4 carbon atoms, cycloalkyl with 5 to 12 carbon atoms, aryl with 6 to 12 carbon atoms, or:

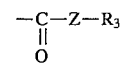

wherein $R_3$ is alkyl with 2 to 8 carbon atoms, cycloalkyl 5 to 12 carbon atoms or aryl or 6 to 12 carbon atoms, and Z is O, NH or $NR_3$; and (a3) 0 to 20 wt % of at least one amphiphilic monomer, whereby the monomer components (a1), (a2) and (a3) together form 100 wt % of the polymer and the polymer (A) has an average molecular weight $M_W$ (mean weight) of at least $5 \times 10^5$ Dalton, the method comprising:

(i) reacting said monomeric components in a first step in an aqueous dispersion in the presence of at least one polymeric dispersing agent (D), thereby preparing a dispersion of polymer (A); and (ii) adding at least one polymeric dispersion agent (D), in an aqueous solution, in a second step, to the dispersion.

2. The method of claim 1, wherein the dispersing agent (D) is a polyelectrolyte with a molecular weight $M_W$ of less than $5 \times 10^5$ Dalton.

3. The method of claim 1, wherein at least one of the water-soluble monomers (a1) has at least one ionic group.

4. The method of claim 1, wherein the amphiphilic monomer (a3) is a compound of formula II:

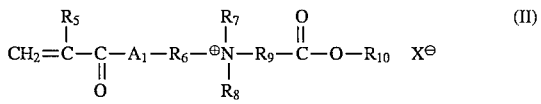

wherein $A_1$ is O, NH, or $NR_4$ wherein $R_4$ is alkyl of 1 to 4 carbon atoms, $R_5$ is hydrogen or methyl, $R_6$ is alkylene of 1 to 6 carbon atoms, $R_7$ and $R_8$, independently from one another, are each alkyl of 1 to 6 carbon atoms, $R_9$ is alkylene of 1 to 6 carbon atoms, $R_{10}$ is alkyl, aryl and/or aralkyl of 8 to 32 carbon atoms, and X is halogen, pseudohalogen, acetate or $SO_4CH_3$.

5. The method of claim 1, wherein the amphiphilic monomer is a compound of formula III:

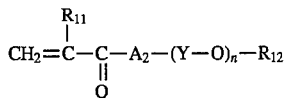

wherein $A_2$ is O, NH or $NR_{13}$ wherein $R_{13}$ is alkyl of 1 to 4 carbon atoms, $R_{11}$ is hydrogen or methyl, $R_{12}$ is alkyl, aryl, and/or aralkyl of 8 to 32 carbon atoms, Y is alkylene of 2 to 6 carbon atoms, and n is an integer of between 1 and 50.

6. The method of claim 1, wherein the dispersing agent (D) is a polyalkylene ether which has an alkylene group of 2 to 6 carbon atoms.

7. The method of claim 1, wherein the amount of polymeric dispersing agent (D) in the polymerization reaction medium is 1 to 50 parts by weight per 100 parts by weight of the reaction medium.

8. A method of flocculating electrically charged particles, comprising:

adding the aqueous polymeric dispersion prepared by the method of claim 1 to a medium containing the charged particles.

9. A method of dehydrating an aqueous substance, comprising:

adding the aqueous polymeric dispersion prepared by the method of claim 1 to said aqueous substance.

10. A method of thickening a substance, comprising:

adding the aqueous polymeric dispersion prepared by the method of claim 1 to a substance to be thickened.

11. A method of treating paper during its production, comprising:

adding the aqueous polymeric dispersion prepared by the method of claim 1 as a retention agent to said paper.

12. A method of improving soil, comprising:

adding the aqueous polymeric dispersion prepared by the method of claim 1 to soil.

13. The method of claim 1, wherein for hydrophobic monomer (a2), aryl of 6 to 12 carbon atoms for $R_2$ and $R_3$ are each selected from the group consisting of phenyl and naphthyl substituted by $C_1$ to $C_4$-alkyl.

14. The method of claim 1, wherein said hydrophobic monomer (a2) is selected from the group consisting of styrene, α-methylstyrene, p-methylstyrene, p-vinyltoluene, vinylcyclopentane, vinylcyclohexane, vinylcyclooctane, isobutene, 2-methylbutene-1, hexene-1,2-methylhexene-1, 2-propylhexene-1, ethyl(meth)acrylate, propyl(meth)acrylate, isopropyl(meth)acrylate, butyl(meth)acrylate, isobutyl(meth)acrylate, pentyl(meth)acrylate, hexyl (mesh) acrylate, heptyl(meth)acrylate, octyl(meth)acrylate, cyclopentyl(meth)acrylate, cyclohexy(meth)acrylate, 3,3,5-trimethylcyclohexyl(meth)acrylate, cyclooctyl(meth)acrylate, phenyl(meth)acrylate, 4-methylphenyl (meth) acrylate, ethylene, vinylidene chloride, vinylidene fluoride and vinyl chloride.

15. The method of claim 2, wherein said dispersing agent has a molecular weight $M_W$ of between about $10^4$ and $4 \times 10^5$ Dalton.

16. The method of claim 6, wherein said polyalkylene ether is selected from the group consisting of polyethylene glycol, polypropylene glycol and polybutylene-1,4-ether.

17. The method of claim 7, wherein said polymeric dispersing agent is used in an amount of between 2 and 40 parts by weight per 100 parts by weight of the reaction medium.

18. The method of claim 1, wherein said polymeric dispersion agent (D) is added to said aqueous polymer dispersion stirring.

19. The method of claim 18, wherein said aqueous polymer dispersion is heated to a temperature of 30° to 90° C. while said polymeric dispersion agent is added thereto.

20. The method of claim 19, wherein said aqueous polymer dispersion is heated to a temperature of 40° to 70° C., while said polymeric dispersion agent is added thereto.

* * * * *

UNITED STATES PATENT AND TRADEMARK OFFICE
CERTIFICATE OF CORRECTION

PATENT NO. : 5,480,934
DATED : January 2, 1996
INVENTOR(S) : Bernfried MESSNER et al.

It is certified that error appears in the above-indentified patent and that said Letters Patent is hereby corrected as shown below:

On the title page, Item [75], the second inventor's name should read:

--Joachim Carl--

Signed and Sealed this

Second Day of April, 1996

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,480,934
DATED : January 2, 1996
INVENTOR(S) : Bernfried Messner, et. al.

It is certified that error appears in the above-indentified patent and that said Letters Patent is hereby corrected as shown below:

Column 4, lines 2 and 3, "acrylate ammonium" should read --acrylate, ammonium--.

Column 4, lines 27-31, Formula (VI) " $CH_2=C-C-Z_1-L$ with $R^{IV}$ above and $O$ double bonded " should read -- $CH_2=C-C-Z_1-L$ with $R^{VI}$ above and $O$ double bonded --.

Column 10, line 6, "$n_1=60,000$" should read --$\eta_1=60,000$--.

Column 10, line 7, "$n_2=2$" should read --$\eta_2=2$--.

Column 14, line 14, "(mesh)" should read --(meth)--.

Column 14, line 16, "cyclohexy(meth)acrylate" should read --cyclohexyl(meth)acrylate--.

Signed and Sealed this

Twenty-second Day of October, 1996

Attest:

BRUCE LEHMAN

*Attesting Officer*  *Commissioner of Patents and Trademarks*